United States Patent [19]

van der Lely

[11] Patent Number: 4,535,859
[45] Date of Patent: Aug. 20, 1985

[54] VEHICLE

[76] Inventor: Cornelis van der Lely, 7 Brüschenrain, Zug, Switzerland

[21] Appl. No.: 584,591

[22] Filed: Feb. 29, 1984

Related U.S. Application Data

[60] Division of Ser. No. 445,738, Nov. 30, 1982, which is a continuation of Ser. No. 131,043, Mar. 17, 1980, Pat. No. 4,448,274.

[30] Foreign Application Priority Data

Mar. 21, 1979 [NL] Netherlands .......................... 7902198
Mar. 21, 1979 [NL] Netherlands .......................... 7902199
Mar. 21, 1979 [NL] Netherlands .......................... 7902200

[51] Int. Cl.³ ............................................. B60K 25/00
[52] U.S. Cl. ........................................ 180/15; 172/439
[58] Field of Search ................ 180/15, 20, 24.02, 197; 280/460 A, 461 A, 481; 172/47, 395, 439; 404/124, 128

[56] References Cited

U.S. PATENT DOCUMENTS

| | | | |
|---|---|---|---|
| 3,477,535 | 11/1969 | Wyatt | 180/20 |
| 3,889,759 | 6/1975 | Larson | 180/20 |
| 3,944,000 | 3/1976 | van der Lely et al. | 172/439 |
| 4,157,877 | 6/1979 | Lee | 180/20 |

FOREIGN PATENT DOCUMENTS 29026 3/1977 Japan ................................. 180/197

Primary Examiner—Joseph F. Peters, Jr.
Assistant Examiner—Ross Weaver
Attorney, Agent, or Firm—Penrose Lucas Albright

[57] ABSTRACT

An agricultural tractor comprises lifting devices to which are hitched rotary supports in the form of rollers. The lifting devices push the rollers downwardly relatively to the rest of the tractor. This transfers some or all of the weight of the tractor to the rollers which reduces or eliminates pressure on the underlying surface, and consequent soil compaction, applied by wheels of the tractor. The rotary supports may be drivable and improve traction. If all of the weight of the tractor is placed on the rotary supports, the wheels are raised from the ground.

A system is also described for automatically detecting and eliminating or correcting for skidding of the wheels of the tractor.

19 Claims, 10 Drawing Figures

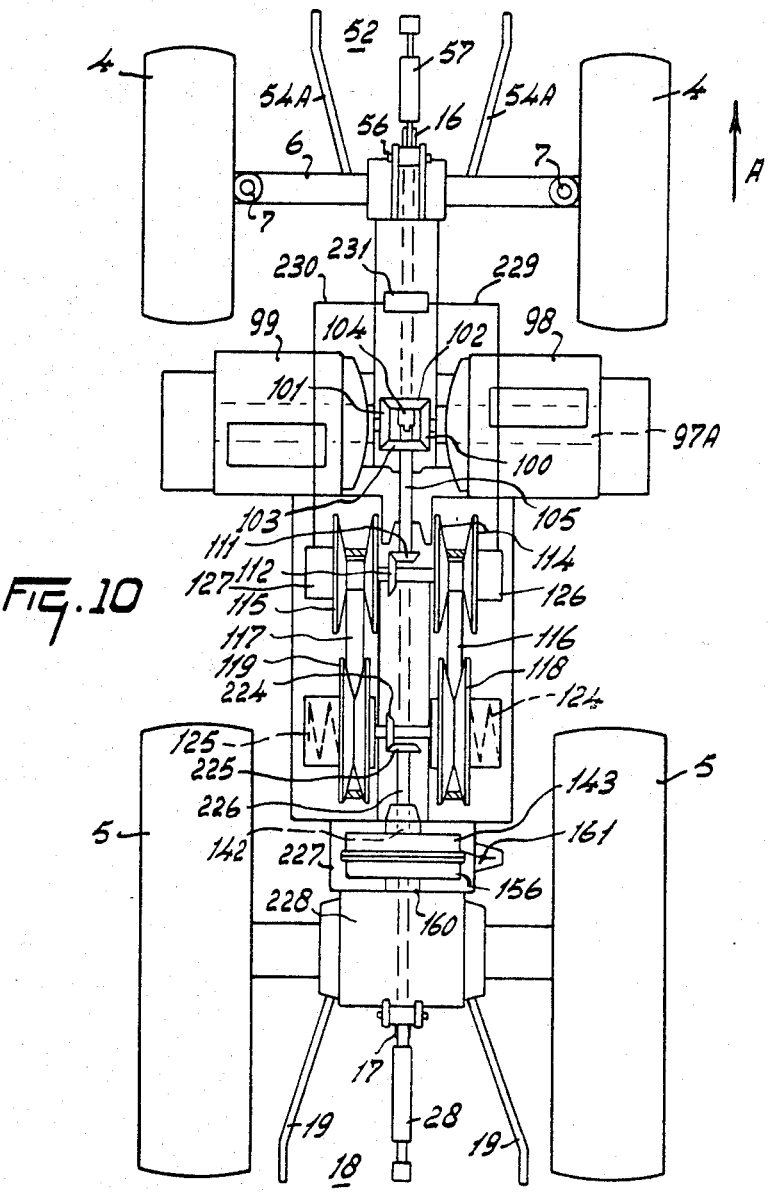

VEHICLE

RELATED APPLICATIONS

This is a division of application Ser. No. 445,738 filed Nov. 30, 1982 which is a continuation of application Ser. No. 131,043 filed Mar. 17, 1980, now patent No. 4,448,274.

SUMMARY OF THE INVENTION

This invention relates to a motor vehicle such as an agricultural tractor.

According to a first aspect of the present invention there is provided a vehicle comprising wheels for supporting the vehicle on the ground and at least one lifting device to which a rotary support can be connected, the lifting device being capable of exerting a downwardly directed force thereby to reduce the pressure applied by at least one of the wheels on the ground.

According to a second aspect of the present invention there is provided a motor vehicle comprising at least two driven ground-engaging rotary members disposed one rearwardly of the other with respect to the intended direction of operative travel, at least one of the rotary members being drivable by means of a steplessly variable change-speed transmission, monitoring means being provided for monitoring the number of revolutions of the two rotary members and for adjusting the change-speed transmissions in a manner such that the peripheral speeds of the two rotary members are maintained substantially equal.

According to a third aspect of the present invention there is provided a motor vehicle comprising a steplessly variable transmission by which at least one wheel axle is drivable, the transmission comprising at least one variable pulley transmission and at least one stepwise variable transmission which is arranged between the variable pulley transmission and the wheel axle.

For a better understanding of the present invention and to show how it may be carried into effect, reference will now be made, by way of example, to the accompanying drawings, in which:

BRIEF DESCRIPTION OF THE DRAWINGS

FIG. 23 is a side view of a tractor which is another embodiment of the invention;

FIG. 10 is a schematic plan view of a fourth tractor, the superstructure of the tractor which is a still further embodiment of the invention being again omitted.

BRIEF DESCRIPTION OF THE PREFERRED EMBODIMENTS

Figure 1:
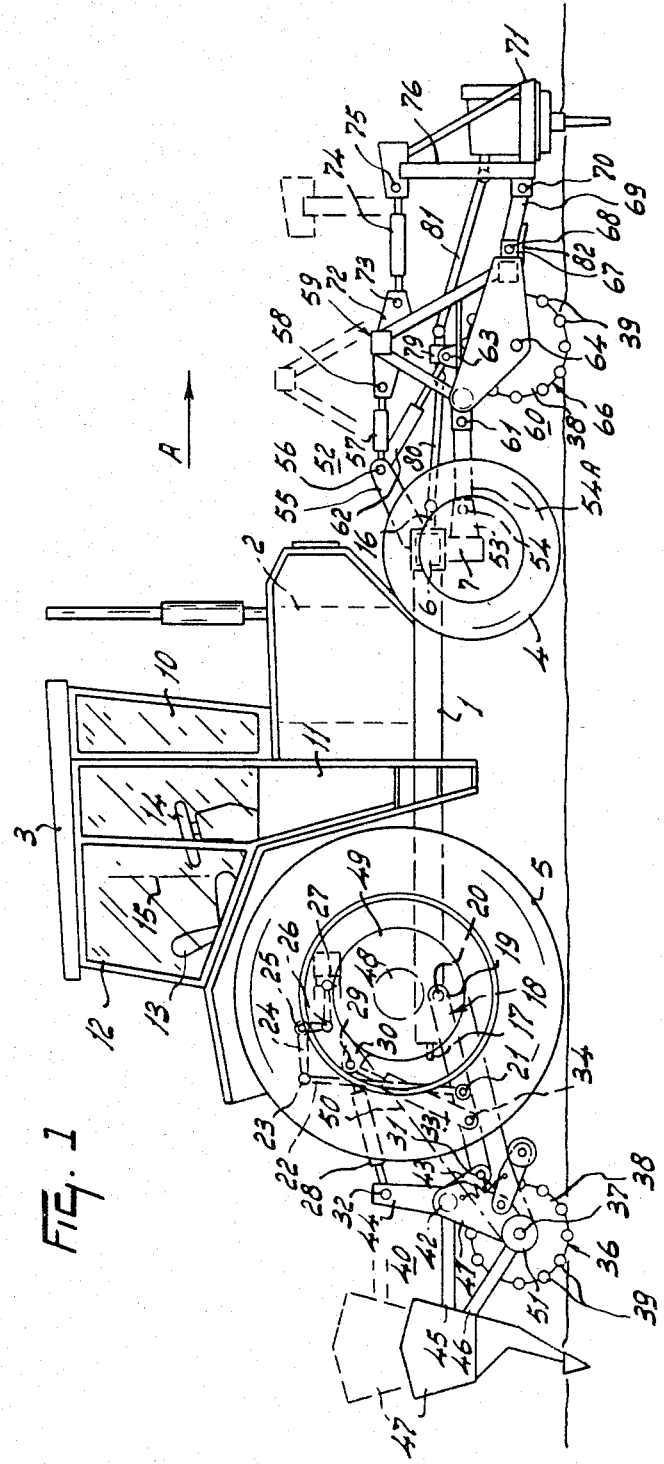
FIG. 1 is a side view of a tractor according to the invention.
Figure 2:
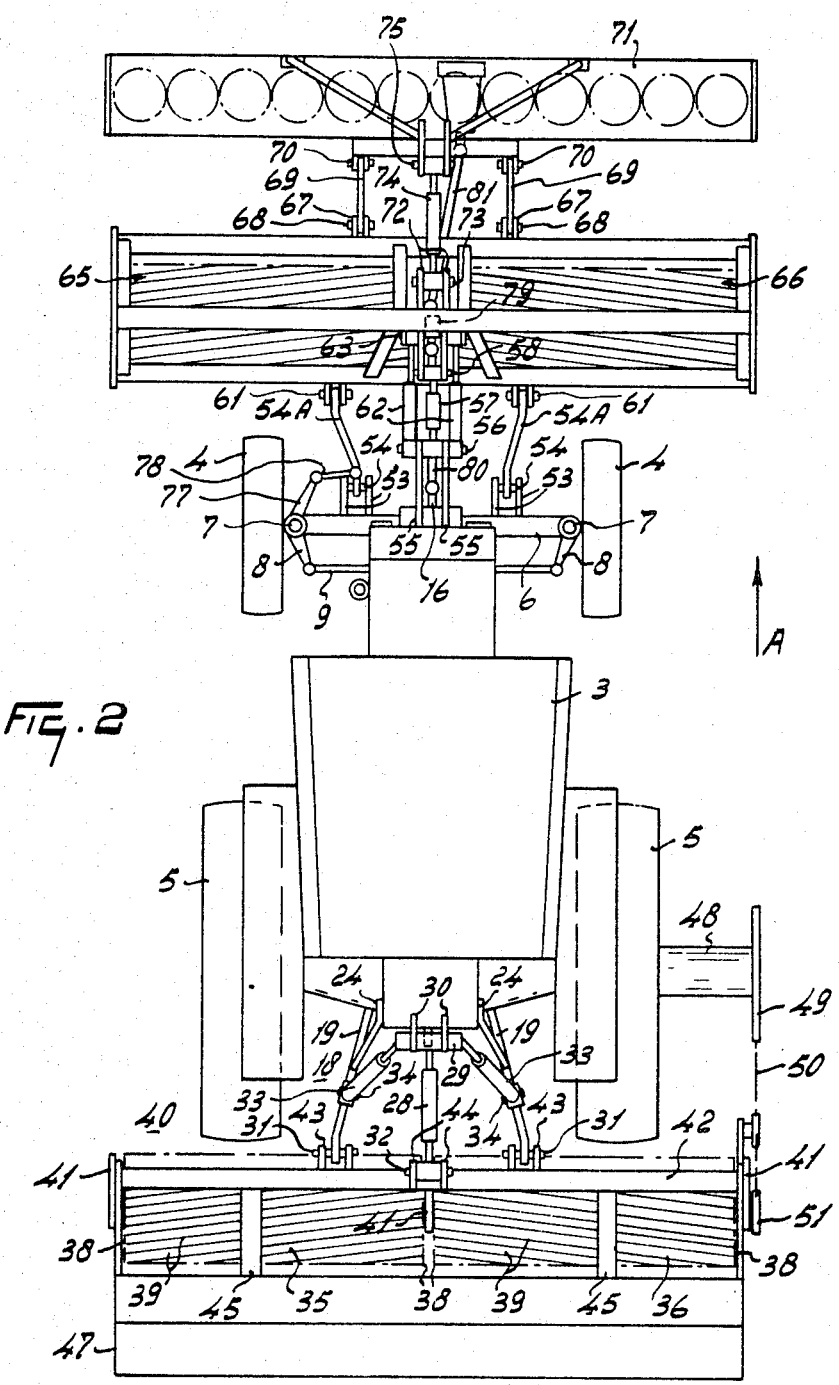
FIG. 2 is a plan view of the tractor shown in FIG. 1.

The tractor shown in FIGS. 1 and 2 comprises a frame 1 on which are mounted a driving engine 2 and an operator's or driver's cab 3. The frame 1 is supported by steerable front wheels 4 and drivable rear wheels 5, which can be coupled with the engine 2 by a torque converter (not shown) and a clutch. The front wheels 4 are mounted on a front axle 6, which is pivotable with respect to the frame 1 about a horizontal pivotal axis lying in the longitudinal central plane of the tractor and extending in the direction of travel indicated by an arrow A. The front wheels 4 are pivotable relatively to the axle 6 about upwardly extending king pins 7, which are secured respectively near the two ends of the front axle 6. The wheels 4 are rigidly secured to track arms 8, which extend from the wheels rearwardly and inwardly. The ends of the track arms away from the wheels are pivotally coupled to a track 9, which extends substantially parallel to the front axle 6 and which can be displaced from the cab 3 for steering the front wheels 4. Viewed in plan, the front end of the engine 2 is located near the front axle 6. With respect to the direction of travel A, the cab 3 is located substantially behind the engine 2 and comprises a front portion 10 having an internal height which is great enough to allow a person who is at least 1.80 meters in height to stand upright. An entrance door 11 of the cab 3 has the same height. The rear portion of the cab 3 accommodates a driver's seat 13, a steering wheel 14 and other control levers and pedals for steering and otherwise controlling the tractor and any implements hitched to it. The seat 13, the steering wheel 14 and at least some of the other controls are arranged on a console, which is pivotable about a substantially vertical axis 15 with respect to the rest of the tractor.

The console, and the seat, steering wheel and other controls on it can be secured with respect to the frame 1 in two positions about the axis 15 differing by 180°. In one of these positions, the driver faces in the direction opposite the direction A. As seen from the side (FIG. 1), the console is located above the front part of the rear wheels 5.

The tractor has a front power take-off shaft 16 and a rear power take-off shaft 17, which are driven by the engine 2 with a speed proportional to that of the engine 2. In this embodiment provision is made for the power take-off shafts 16 and 17 to be driven at a speed which is proportional to that of the driven rear wheels 5. For this purpose a change-over gear box (not shown) is provided, which has two input shafts, one of which is coupled with the engine 2 by a driver-controlled clutch and the other of which is coupled, also by a clutch, with the output shaft on the torque converter.

At the rear, the tractor has a three-point lifting device 18 having two lower lifting arms 19 attached to the frame 1 for pivotal movement about pivotal shafts 20. Substantially midway along their length, the lower lifting arms 19 have pivotal shafts 21, to which upwardly extending pull rods 22 are fastened, the top ends of which are pivotably coupled by shafts 23 to bell cranks 24, which are pivotable about pivotal shafts 25 with respect to the frame 1. The ends of the bell cranks 24 away from the shafts 23 are connected by pivotal shafts 26 to the piston rods of hydraulic rams 27, which are pivotably mounted on the frame 1. The hydraulic rams 27 can be actuated by the driver so that the pull rods 22 can turn the lower lifting arms 19 upwards. Otherwise, by opening a hydraulic connection, the driver can cause the hydraulic fluid to flow out of the hydraulic rams 27 to allow the lower lifting arms 19 to turn downwards under the effect of gravity acting, for example on an attached machine. The lifting device 18 comprises furthermore an upper arm 28, the length of which is adjustable and which is pivotably connected by a pivotal shaft 29 to lugs 30 which are fixed to the frame 1. The machine or the tool is hitched to the outermost ends of the lifting arms 19 and 28 by pins 31 and 32 respectively.

In addition to the components of the three-point lifting device 18 described above, there are provided two hydraulic rams 33, which are disposed symmetrically with respect to the central vertical longitudinal plane of the tractor and the top ends of which are pivotably connected by the pivotal shaft 29 to the lugs 30. The lower ends of the hydraulic rams 33 are pivotably connected by horizontal pivotal shafts 34 to the respective lower lifting arms 19 concerned. The orientation of the rams 33 is such that in the side elevation of FIG. 1 a line of connection between the shafts 29 and 34 is, in this embodiment, an angle of about 15° to 30° to the vertical, the rams 33 being inclined to the rear from top to bottom. The two hydraulic rams 33 can be actuated from the driver's seat 13 so that their lengths are increased under pressure so that the lower lifting arms 19 are forcibly pressed down. The hydraulic rams 33 are provided in addition to the hydraulic three-point lifting device 18 already provided on the tractor. It is furthermore also possible for the rams 27 to be double-acting and for the linkage 21 to 26 to be constructed in a manner such that the rams 27 can press the lower lifting arms 19 forcibly downwards.

A rotary support for the tractor is connected to the lifting device 18 by the pins 31 and 32. This rotary support comprises in this embodiment two rollers 35 and 36 having the same dimensions as each other, and having aligned rotary shafts 37. The rollers 35 and 36 are arranged end-to-end and cover a width which may be 20% to 50% larger than the overall width of the tractor itself. The rollers 35 and 36 are disposed symmetrically one on each side of the central vertical longitudinal plane of the tractor. As an alternative, a single roller or more than two rollers end-to-end may be arranged to cover the width covered by the rollers 35 and 36. If more than one roller is used, the rollers may both be rigidly secured to a common rotary shaft 37, as in the embodiment shown, but embodiments are possible, in which each roller is driven independently about its own rotary shaft 37.

Each of the rollers 35 and 36 has near each end an end plate 38 supported by the rotary shaft 37. Each end plate 38 supports at its periphery a great number of rods or tubes 39 which extend helically around the rotary shaft 37, these rods or tubes 39 together providing a substantially cylindrical outer surface for each roller 35, 36. This cylindrical outer surface may, as an alternative, be formed by flat strips extending helically or axially, the faces of which constitute the outer surface of the rollers.

The rollers 35, 36 are supported by the rotary shaft 37 in a frame, indicated generally by reference numeral 40, having at its two outer ends side plates 41 the top edges of which are interconnected by a supporting beam 42 extending transversely of the direction A. The supporting beam 42 is provided with downwardly extending lugs 43, through which pass the pins 31 at the rear ends of the lower lifting arms 19. Midway along the length of the supporting beam 42 there is a pair of lugs 44 for receiving the pins 32 to connect the upper arm 28 of the lifting device 18 to the supporting beam 42. The frame 40 of the rotary support is provided with rearwardly projecting carriers 45 and 46, by means of which a machine or a tool, in this embodiment a seed drill 47, is fastened to the frame 40. In this embodiment the seed drill 47 covers the whole width of the frame 40.

In this embodiment one of the wheel axles of the drivable wheels 5 of the tractor is extended by a length of tubing 48, the outer ends of which carries a chain sprocket 49 which is drivably connected by a chain 50 with a further chain sprocket 51 rigidly secured to the rotary shaft 37. The diameters of the sprockets 49 and 51 are selected so that the rollers 35 and 36 are driven by the engine 2 with a peripheral speed which is equal to that of the rear wheels 5. As an alternative, the rollers 35 and 36 may be driven by means of the power take-off shaft 17, when the latter is coupled by the aforesaid change-over gear box with the output shaft of the toque converter of the tractor.

In an analogous manner a rotary support for the tractor is hitched to a three-point lifting device, indicated generally by reference numeral 52, at the front of the tractor. In this embodiment the lifting device 52 is secured only to the front axle 6, but this lifting device may, as an alternative, be secured directly to the frame 1 of the tractor. The front axle 6 is provided with two pairs of lugs 53 projecting forwardly. Lower, lifting arms 54A are pivotably connected to the pairs of lugs 53 by aligned pivotal shafts 54. At the center the top face of the front axle 6 is provided with a pair of lugs 55 which are inclined forwardly from bottom to top. A top lifting arm 57 of the lifting device is pivotally supported at the front ends of the lugs 55 by a pivotal shaft 56, which extends, like each of the pivotal shafts 54, horizontally and transversely of the direction A. The length of the top arm 57 is variable. The leading end of the top arm 57 is pivotably connected to a rigid frame 59 by a pivotal shaft 58. The frame 59 is part of a rotary support, designated generally by reference numeral 60, carried by the lifting device 52. The lower lifting arms 54A are pivotably connected to the frame 59 at their front ends by pivotal shafts 61. As seen from the side, the lower lifting arms 54A and the top lifting arm 57 are substantially parallel to one another and are substantially horizontal in a normal operational position of the support 60. A double-acting hydraulic ram 62 is supported at one end by the pivotal shaft 56 and the other end is pivotably connected to the frame 59 by a pivotal shaft 63. As seen in FIG. 2, there are two hydraulic rams 62 which are in a parallel relationship.

The pivotal shafts 54, 56, 58, 61 and 63 are all parallel to one another and extend horizontally and transversely of the direction A. As seen from the side (FIG. 1), the pivotal shafts 54, 56, 58 and 61 are located at the corners of a quadrilateral which, as shown, is almost a parallelogram. The pivotal shafts 58, 61 and 63 are all fastened to the rigid frame 59 of the rotary support 60 and are thus disposed at the corners of a rigid triangle regardless of the lengths of the hydraulic rams 62.

In the frame 59 is journalled a substantially horizontal rotary shaft 64, which is parallel to the rotary shaft 37 when the tractor is travelling in a straight line. Rotatable rollers 65 and 66 are mounted on the rotary shaft 64. The rollers 65 and 66 are arranged end-to-end. They have the same dimensions as the rollers 35 and 36 and are constructed in a similar manner. The width covered by the pair of rollers 65 and 66 is equal to that covered by the rollers 35 and 36. The rollers 65 and 66 are in front of the front wheels 4, whereas the rollers 35 and 36 are behind the rear wheels 5.

Because it is mounted on the front axle 6, the support 60 is freely pivotable with respect to the frame 1 of the tractor about the same horizontal pivotal axis located in the central vertical plane of the tractor as is pivotable about front axle 6 is pivotable about.

The front of the frame 59 is provided with two pairs of lugs 67 carrying aligned pivotal shafts 68 which pivotably connect arms 69 to the frame 59. These arms 69 project forwardly from the frame 59 and are inclined slightly downwardly from back to front when in an operational position. The front ends of the carrier arms 69 are pivotally connected by aligned pivotal shafts 70 with a machine or tool which, in this case, is a rotary harrow 71. Near the top of the frame 59 there is a pair of ears 72 supporting a pivotal shaft 73 which pivotably connects an adjustable length rod 74 to the frame 59. The front end of the rod 74 is pivotably connected by a pivotal shaft 75 to the top fastening point of a trestle 76 carrying the machine 71.

About one or both of the king pins 7 is pivotable a lever 77, which, like the track arm 8, is rigidly secured to the adjacent wheel 4. The lever 77 extends forwardly away from the king pin 7 in the direction towards the adjacent lower lifting arm 54A. The lever 77 is connected by a control link 78 with the adjacent lower lifting arm 54A, this control link 78 being pivotally connected both to the lever 77 and to the lower lifting arm 54A. The pivotal connection between the control link 78 and the lower lifting arm 54A is in front of the pivotal shaft 54.

It should be noted that the rollers 65 and 66 of FIGS. 1 and 2 are rotatable independently of one another about the rotary shaft 64. In an alternative construction, the rollers 65 and 66 may be driven by the power take-off shaft 16, when the latter is coupled with the output shaft of the torque converter of the tractor. In this case there is provided a change-over gear box in a manner not shown, the input shaft of which is coupled by means of an auxiliary shaft with the power take-off shaft 16 and the output shaft of which is drivably connected through a gear transmission with the rotary shaft 64, to which the rollers 65 and 66 are then rigidly secured.

However, in the embodiment shown the frame 59 of the support 60 has fastened to it a bearing housing 79, through which passes an auxiliary shaft 80. The shaft 80 is connected at one end by a universal coupling with the power take-off shaft 16 and at the other end by a further universal coupling to a second auxiliary shaft 81. The second auxiliary shaft 81 is connected by a third universal coupling to the input shaft of the machine 71. In this way the machine 71 can be driven from the power take-off shaft 16.

In agricultural work the tracks made in the ground by the tractor wheels may often be undesirable. If, for example, a field is first harrowed before manure, fertilizer or seed is applied, the pressure of the tractor wheels on the harrowed soil locally packs the soil so that the soil structure obtained by harrowing, and in particular the distribution of capillaries, is adversely affected. After the growth of the plants this adverse effect becomes manifest. In order to obviate this disadvantage the pressure of the tractor constructed in the form shown in FIGS. 1 and 2 on the ground is reduced to such a low value that the underlying soil structure, particularly in the region of the plant roots, is maintained wholly or substantially wholly in the form obtained by harrowing. This applies not only to harrowing but also to soil treatments by means of other soil cultivating machines. It can thus be ensured that the seeds can germinate and grow in a soil structure which is not, or is only slightly, affected by the weight of the tractor.

From his seat 13 the driver can lift the rotary support at the front or both at the rear of the tractor together with the tool (the rotary harrow 71 or the speed drill) by means of the hydraulic ram 27, which is normal tractor equipment and acts through the bell cranks 24, the pull rods 22 and the lower lifting arms 19 and the top arm 28, or by means of the double-acting hydraulic ram 62, by means of which the foremost support 60 and the machine 71 are movable relatively to the front axle 6. When a hydraulic communication in the hydraulic feed of the ram 27 is opened, the rear support and the seed drill drop to the ground under their own weight, whereas the front support and the machine 71 can be lowered to the ground by extending the rams 62 by hydraulic pressure. However, the hydraulic ram 27 which is standard equipment is not able to exert downwards pressure on the rear support 35, 36 and on the machine 47. For this purpose the two hydraulic rams 33 are provided, which can be actuated from the driver's seat to force the lower lifting arms 19 downwardly about the pivotal shafts 20 so that, in a first instance, part of the tractor weight is taken by the rollers 35, 36. In the same manner the hydraulic rams 62 can be extended by hydraulic pressure so that the roller 65, 66 also support, in a first instance, part of the tractor weight. Thus the pressure applied by the tractor wheels 4 and 5 to the ground is reduced so that compression of the soil by the wheels 4 and 5 and the consequent deterioration of the structure is reduced because, for a given weight, the pressure exerted by the combination of the rollers 35, 36 and 65, 66 and the wheels 4, 5 is an order of magnitude lower than the pressure exerted by the wheels 4 and 5 when they provide the sole support of the tractor.

In order to improve further this advantageous effect of the reduced ground pressure, the pressure in the rams 33 and 62 can be increased by the driver to an extent such that the full weight of the tractor, the supports and the machines is taken by the rollers 35, 36 and 65, 66 so that the tractor wheels 4 and 5 no longer exert any significant pressure on the ground and may even be lifted clear of the ground. The overall weight is then distributed along the long rollers and the ground pressure is then reduced to such a low value that deterioration of the soil structure in the region of plant roots is avoided.

The height of the equipment 47 and 71 above the ground is determined by the positions of this equipment with respect to the rollers 35, 36 and 65, 66 respectively. Despite the fact that the support 60 moves with respect to the tractor when the tractor is lifted, the orientation of the frame 59 of the support 60 does not change significantly, since the pivotal shafts 54, 56, 58 and 61 are located, as viewed from the side, at the corners of what is substantially a parallelogram so that the attached machine also maintains its initial orientation. This is important for machines wherein their orientation with respect to the ground influences the quality of the treatment, as in the case of a rotary harrow 71. It should be noted that beneath each of the two carrier arms 69 of the harrow 71 there is a stop 82 positioned for abutment with the carrier arms 69 loaded by the weight of the tool 71. This stop 82 is rigidly fastened to the frame 59 of the support 60 and prevents the tool 71 from shifting too far downwards relative to the support 60, when, for example, the support 60 is lifted by means of the hydraulic rams 62.

When the driver wants to make a turn, the track rod 9 is displaced approximately parallel to itself so that the track arms 8 and hence also the front wheels 4 turn about the king pins 7. At the same time the lever 77 is turned about the respective king pin 7. The control link 78 connecting the lever 77 to the adjacent lower lifting arm 54A causes this lower lifting arm to turn about the associated pivotal shaft 54. This is permitted because the lower lifting arm 54A is mounted on the pivotal shaft 54 by a ball-and-socket joint. Therefore, when the front wheels 4 turn about the shafts 7 the rotary support 60 of the tractor will turn likewise so that the support 60 guides the tractor round the bend regardless of whether or not the front wheels 4 are in contact with the ground. The machine 71 coupled to the front of the support 60 is turned at the same time and steered through the bend. During operation, the assembly of the support 60 and the machine 71 is pivotable with respect to the tractor frame about the pivotal axis about which the front axle 6 is pivotable so that the support 60 and the machine 71 can follow unevennesses of the ground independently of the rear roller 35, 36.

The torque converter which transmits power between the engine 2 and the driven wheels 5 comprises at least one variable belt transmission and, in addition, a stepwise change-speed gearbox, which is arranged between the variable belt transmission and the axle of the wheels 5. The construction of this torque converter can correspond with that described with reference to any one of the following embodiments. With the elements of the torque converter disposed as will be described, an advantageous load of the belt transmission is obtained with differently adjusted transmission ratios of the stepwise change-speed gearbox so that for each transmission ratio set in a change-speed gearbox (for example, to provide a range of low speeds for exerting high tractive power and a range of higher speeds for actuating light machines or for road travel) the pulley speed of the belt transmission can be adjusted steplessly to transmit maximum torque and/or power.

The tractor can be used in either direction of travel so that, depending upon the circumstances, the driven rotary support can be disposed at the front or at the rear of the tractor, with respect to the actual travel direction, and also in front of or behind the implement. Apart from the nature of the implement (it is sometimes preferable to employ implements hitched to the front of the tractor) the necessity that the driver is able to supervise the job must also be a consideration. Depending, therefore, on whether or not the driven rotary support and the implement to be used is to be at the front or at the rear of the tractor, the driver's seat and the steering wheel and other controls mounted on the console can be turned about the pivotal axis 15 to face the driver in the direction A or in the opposite direction.

Figure 3:
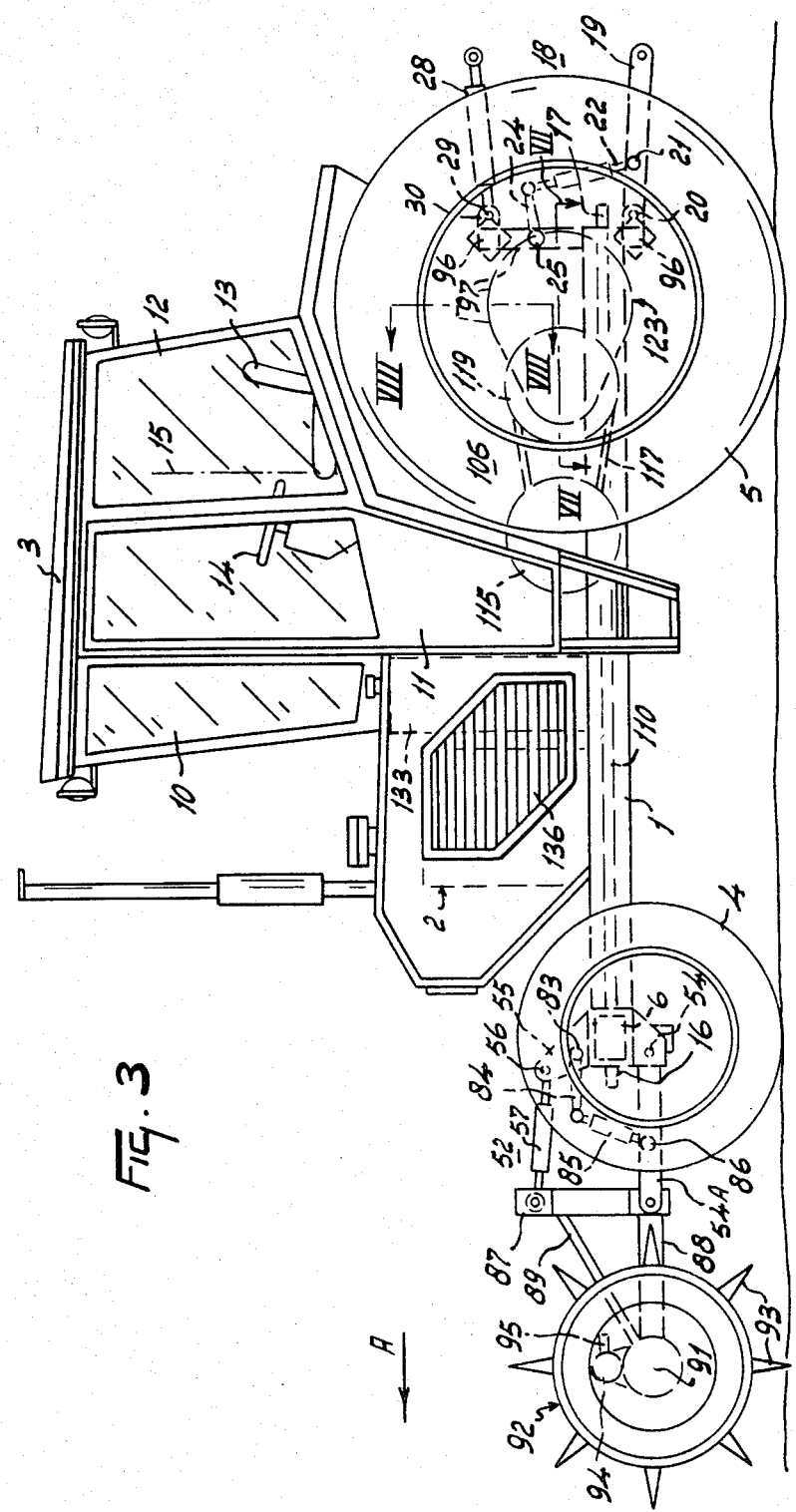
Figure 4:
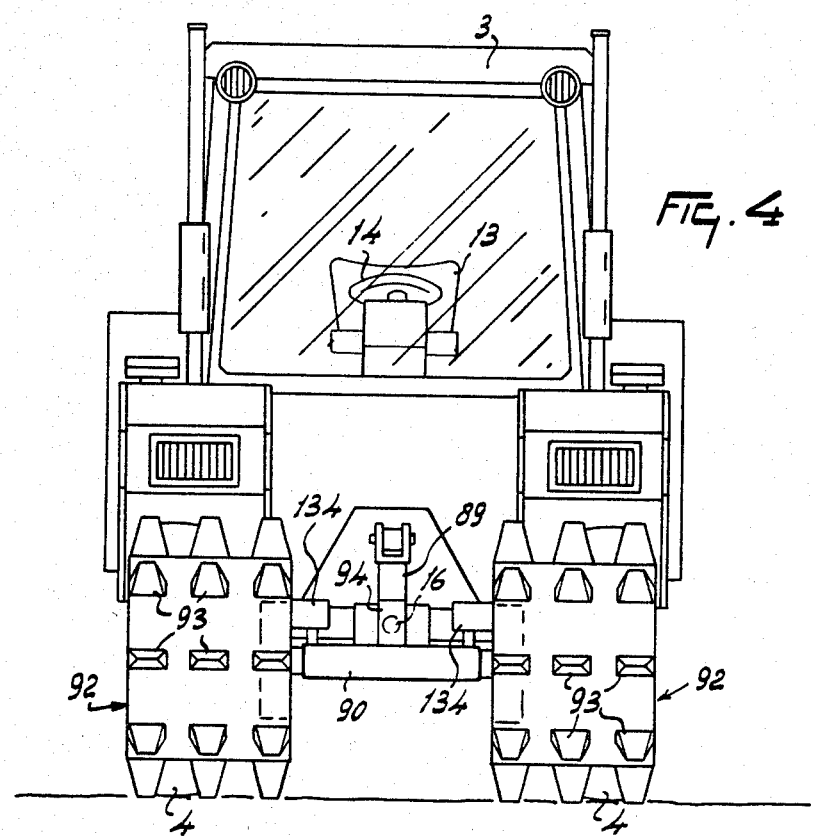
FIG. 4 is a front view of the tractor shown in FIG. 3.

FIGS. 3 and 4 show another tractor construction having a rotary support, which in this case may serve in addition as a non-skid device. Parts having therefore functions which correspond with those of the parts shown in FIGS. 1 and 2 are designated by the same reference numerals. As in the preceding embodiment the front power take-off shaft 16 is coaxial with the pivot axis about which the front axle 6 is pivotable with respect to the frame 1.

Figure 5:
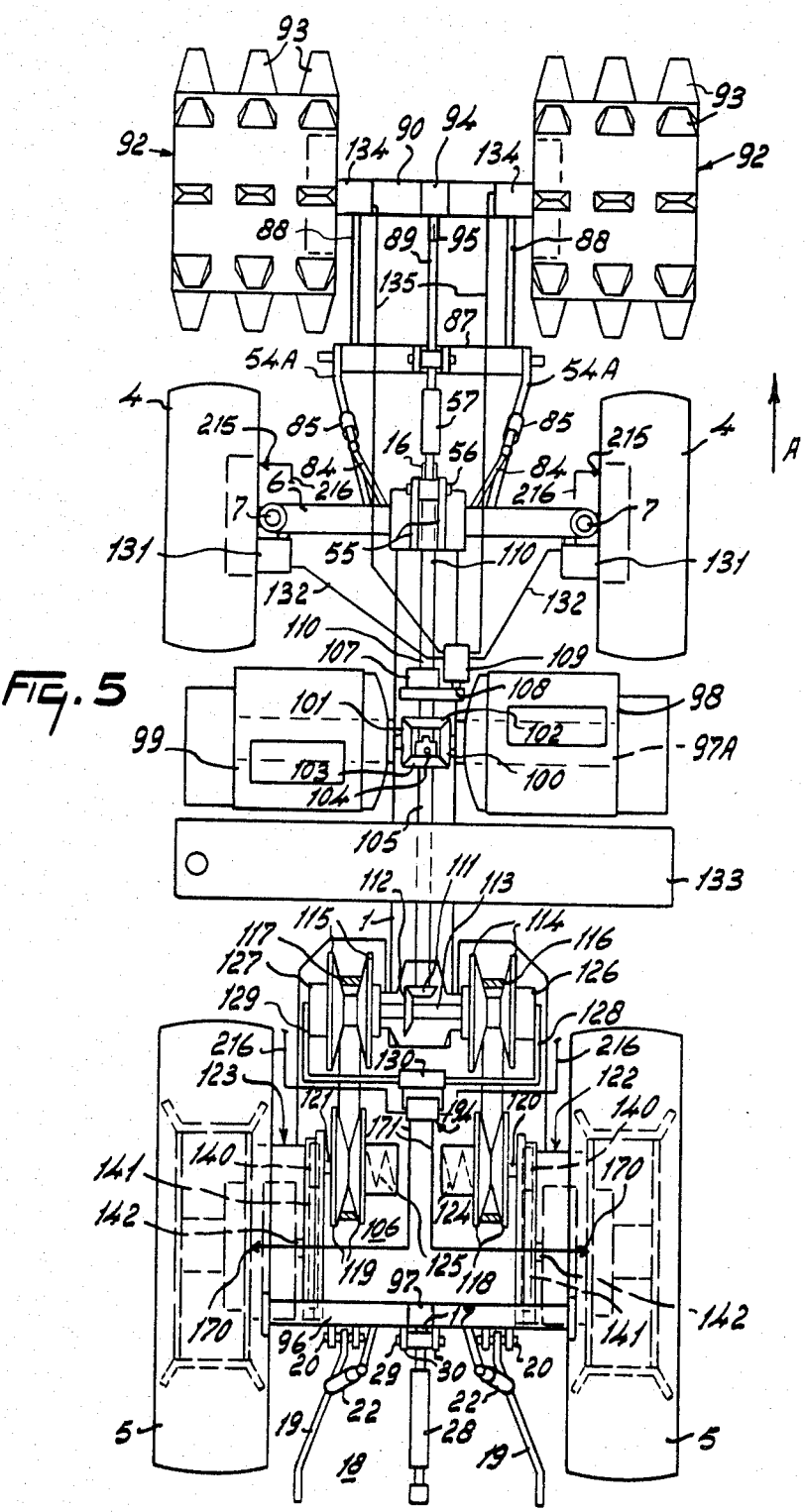
FIG. 5 is a plan view of the tractor shown in FIGS. 3 and 4, the superstructure of the tractor being omitted.

The construction of the front lifting device 52 of the tractor shown in FIGS. 3 to 5 slightly differs from that of the preceding embodiment. The interior of the hollow front axle 6, which is pivotable about the shaft 16 with respect to the rest of the tractor, accommodates one or more hydraulic devices capable of turning two pivotal shafts 83 disposed above the front axle 6 one on each side of the central longitudinal plane of symmetry of the tractor. A lever 84 is rigidly secured to each shaft 83. The end of each lever 84 away from the pivotal shaft 83 is pivotally coupled to a connecting element 85, the lower end of which is connected by a pivotal shaft 86 with a lower lifting arm 54A. The connecting element 85, in this embodiment, is a double acting hydraulic ram actuable from the driver's seat independently of the hydraulic device in the front axle 6.

A trestle 87 is hitched to the front ends of the lower lifting arms 54A and the top arm 57. This trestle 87 has the shape of an inverted V, as viewed in the direction of travel A. Near the places where it is hitched to the lifting arms 54A, trestle 87 has two forwardly projecting, substantially horizontal carrier arms 88 secured to it, and near the place where it is hitched to the top arm 57, there is secured a rod 89 which is inclined downwardly from back to front. The carrier arms 88 and the rod 89 support at their front ends a sleeve 90, in which is journalled a rotary shaft 91 extending parallel to the front axle 6. Rotary members 92 in the form of wheels or drums are mounted on the portions of the rotary shaft 91 projecting from the ends of the sleeve 90. In the embodiment illustrated the width of each of these rotary members 92 is substantially equal to the distance between the lowermost point of the trestle 87 and the lateral boundary of the tractor, but this width may be larger. The diameter of each rotary member 92 is about 50 to 90% of the diameter of the adjacent tractor wheel 4. The rotary members 92 are disposed symmetrically about the central longitudinal plane of the tractor. The outer circumference of each of the rotary members 92 is constituted by cylindrical sheet material provided with a plurality of rows (in this embodiment there are eight rows), of pointed projections 93, which extend radially outwardly. Each row of projections comprises, for example, three projections 93. As seen from the side, each projection 93 is tapered, and as seen in a tangential direction, each extension 93 looks, in outline, like a truncated cone, so that when a projection 93 has penetrated into the ground, a large driving contact surface is obtained between each projection 93 and the ground.

The sleeve 90 is provided with a gearbox 94 having an input stub shaft 95 projecting towards the power take-off shaft 16. The input stub shaft 95 can be drivably connected by an auxiliary shaft to the power take-off shaft 16, in which case the auxiliary shaft would pass through the V-shaped trestle 87. The pinion transmission in the gearbox 94 provides a speed difference between the power take-off shaft 16 and the rotary shaft 91, the rotary shaft 91 is provided near the gearbox 94 with a pinion which is in mesh with the pinion transmission in the gearbox 94.

The rotary support comprising the elements 92 and the associated frame parts 87, 88 and 89 and the driving elements 94 and 95 may also be fastened to the rear lifting device 18, the drive then being applied by the power take-off shaft 17. In this way the tractor can be provided at the front as well as at the rear with a rotary support as in the preceding embodiment. In this embodiment both supports are drivable. The support at the front can be lifted by means of the hydraulic device accommodated in the hollow front axle 6, which device can cause the levers 84 and the connecting elements 85 to turn, while the support at the back can be raised by turning the pivotal shafts 25 and the associated levers 24 as well as the pull rods 22. The pull rods 22 may be replaced by separately actuable double-acting hydraulic rams controlled from the driver's seat so that when the rotary supports have been lowered to the ground, they can be forced downwards by the energization of the hydraulic ram 22 and of the double-acting ram 85, so that the pressure of the tractor wheels 4 and 5 on the ground can be reduced or eliminated at the driver's option as is described for the first embodiment.

Elements 92 hitched to front or rear or both lifting devices of the tractor are also effective as non-skid devices. The elements 92 can be pressed to the ground by the hydraulic rams 22 and 85, as the case may be, with enough force to cause the projections 93 to penetrate the ground, while the wheels 4 and 5 continue to bear on the ground with almost the full wheel pressure. The projections 93 provide a firm grip on the ground so that an appreciable part of the driving torque provided by the driving engine 2 is transferred through the non-skid arrangement to the ground and therefore, the torque to be transferred by the wheels 4 and 5 may be lower when the elements are driven by the power take-off shafts 16 and 17. By fastening the supports or non-skid devices 92 to the front and rear lifting devices the tractor can be employed on slack or yielding soil while the pressure of the tractor can be reduced to avoid deterioration of the soil structure by compaction. In the latter case the elements 92 may, if desired, be pressed against the ground with considerably heavier force than in the first case. Consequently, despite the attached heavy machines, a comparatively low ground pressure can be ensured. The non-skid device 92 has a simple structure and can be readily detached. When the non-skid device 92 is raised from the ground, its weight increases the pressure of the wheels 4 and 5 on the ground, which is advantageous under normal soil conditions for producing strong traction forces.

A drive arrangement which can be used with either of the tractors of FIGS. 1 to 4 is shown schematically in FIG. 5. The frame 1 comprises a central, hollow frame beam extending away from its junction with the front axle 6 to behind the axles of the wheels 5. Near its rear end, the frame beam 1, which is located in the central vertical longitudinal plane of the tractor, is rigidly secured to a beam 96 which extends transversely of the direction A and carries the lower lifting arms 19 and a vertical supporting beam 97 located in the central longitudinal vertical plane of the tractor. The top arm 28 of the lifting device 18 is attached to the beam 97 by the pivotal shaft 29.

At a position behind the rear most points of the front wheels 4 and in front of the rear wheels 5, a hollow beam 97A is secured to the central, hollow frame beam 1. This beam 97A supports driving engines 98 and 99 which are arranged so that their output shafts are aligned with and project towards one another, the output ends of the engines facing one another. In this embodiment the output shafts are at right angles to the central vertical plane of the tractor, but they may be inclined to that plane. The engines 98 and 99 are disposed one on each side of the central vertical plane of the tractor. The adjacent ends of the output shafts of the engines are provided with bevel gear wheels 100 and 101 respectively, both of which mesh with bevel gear wheels 102 and 103 located one on each side of a vertical plane containing the axes of the output shafts of the engines 98 and 99. The axis of the bevel gear wheels 102, 103 are aligned with one another and are parallel to and above the centerline of the hollow frame beam 1. Between the bevel gear wheels 102 and 103 there is a coupling piece 104, which is splined to, and therefore axially slidable along, a drive shaft 105 of a variable transmission 106 of the tractor. Axial displacement of the coupling piece 104 along the drive shaft 105 causes the shaft 105 to engage either the bevel gear wheel 102 or the bevel gear wheel 103 so that the drive shaft 105 can be rotated in either direction by one or both of the engines 98 and 99. The gear wheels 102 and 103, if they are not rotationally coupled with the shaft 105 by the coupling piece 104, are, therefore, freely rotatable about the shaft 105 (overrunning). The shaft 105 projects forwardly beyond the gear wheel 102 and constitutes an input shaft of a gear box 107. The gear box 107 has two output shafts 108 and 110. The output shaft 108 drives a hydraulic pump 109 and the output shaft 110, which is accommodated in the hollow beam 1 and projects beyond the front end of the hollow beam 1, constitutes a power take-off shaft 16, as well as constituting the pivotal shaft about which the front axle 6 is pivotable with respect to the frame beam 1. The portion of the drive shaft 105 located behind the gear wheel 103 drives by means of two bevel gear wheels 111 and 112 a horizontal shaft 113 extending at right angles to the vertical central plane of the tractor. The shaft 113 has near each end a pulley 114 or 115 respectively, these pulleys being disposed symmetrically one on each side of the vertical central plane of the tractor. The pulleys 114 and 115 are drivably connected by drive belts 116 and 117 respectively with pulleys 118 and 119 respectively, each of which is mounted on a shaft 120 and 121 respectively. The shafts 120 and 121 constitute input shafts of stepwise change-speed gearboxes 122 and 123 respectively (FIG. 5), the output shafts of which drive the rear wheels 5 of the tractor. The gearboxes 122 and 123 are both adjustable from the driver seat in a manner such that the same speed of the shafts 120 and 121, two ranges of speeds of the wheels 5 can be provided.

The inboard flange of each pulley 118 and 119 is biased by a spring 124 and 125 respectively towards the other flange of the pulley concerned, and so the associated belt 116 and 117 respectively is clamped between the conical faces of the flanges.

The outboard flange of each pulley 114 and 115 can be urged by means of hydraulic means in a housing 126 or 127 respectively towards the inboard flange of the respective pulley. Such hydraulic means, known in the art, and are supplied with hydraulic fluid through hydraulic conduits 128 and 129 respectively, both of which lead from a control valve 130, which can be adjusted by the driver or by a control device.

The drive shaft 105 is coupled through one or more pinions (located in the hollow beam 1) drivably engaging the pinion 101 with the rear power take-off shaft 17; which take-off shaft extends to the rear inside the hollow beam 1.

In this embodiment the front wheels 4 are driven by hydraulic motors 131 mounted on the front axle 6, the output shafts of which drive, via a gear transmission a ring gear which is rigidly secured to the wheel rim. The hydraulic pump 109 is connected to the hydraulic motors 131 by two pairs of lines 132.

A fuel tank 133 is arranged behind the two engines 98 and 99 and between the pairs of wheels 4 and 5. The tank 133 is thus located between the two engines and driver's seat 13. Viewed on plan, the fuel tank is elongate and its length is at right angles to the central vertical plane of the tractor. The tank covers the whole width of the tractor. Seen from the side, the fuel tank 133 is substantially the same height as the engines 98 and 99. This has the advantage that the noise produced by the engines will not readily penetrate into the cab owing to the screening effect of the fuel tank and its contents.

As stated above, the elements 92 can be driven from the power take-off shaft 16 by means of an auxiliary shaft and the gearbox 94. FIG. 5 shows an alternative drive in which each of the elements 92 can be driven by a hydraulic motor 134, the housing of which is fastened to the sleeve 90. The hydraulic motors 134 communicate through pairs of hydraulic lines 135 with the pump 109.

Inlets 136 for air intended for cooling the two engines 98 and 99 are provided (see FIG. 3) in the sides of the engine cover of the tractor. These air inlets 136 in the sheet cover are larger than the radiator of the engine concerned located behind them.

Figure 7:
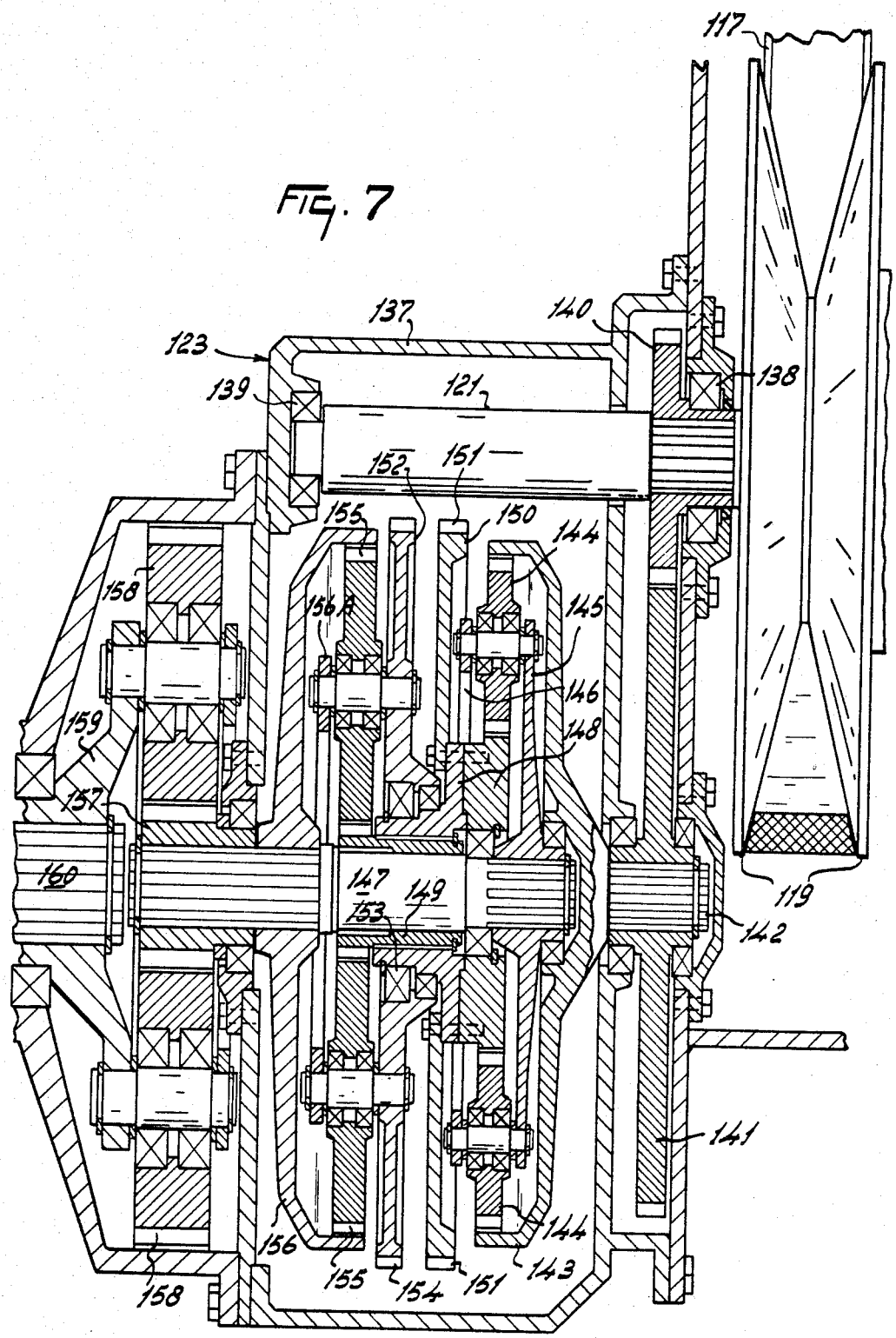
FIG. 7 is a sectional view taken on the lines VII—VII in FIG. 3.

The stepwise change-speed gearbox 123 (FIG. 5) is shown in section in FIG. 7. The other gearbox 122 is the mirror-image of this one. The output shaft 121 of the pulley 119 is supported in a housing 137 of the gearbox 123 by bearings 138 and 139. The bearings 138 and 139 are spaced apart by a comparatively large distance because of the load applied to the shaft 121 by the belt 117. The shaft 121 is drivably connected by means of two meshing pinions 140 and 141 with a shaft 142 which is parallel to the shaft 121. The transmission ratio between the pinions 140 and 141 is such that the shaft 142 rotates more slowly than the shaft 121. An internally toothed annulus 143 is rigidly secured to the shaft 142. The teeth are near the outer periphery of the annulus 143, and they mesh with the teeth of a plurality of planet wheels 144, which are mounted on shafts journalled in the planet carrier 145 and in a supporting ring 146. The planet carrier 145 is splined to an auxiliary shaft 147 which is coaxial with the shaft 142. The planet wheels 144 mesh with a sun wheel 148 which is keyed to a sleeve 149. The sleeve 149 is freely rotatable about the auxiliary shaft 147. A ring 150 is bolted to the sun wheel 148, the outer periphery of this ring being provided with teeth 151. A second ring 152 is mounted on bearings 153 on a spigot-like portion of the sun wheel 148. The ring 152 has the same diameter as the ring 150 and is also provided with teeth 154 on its outer periphery. The ring 152 serves as a further planet carrier, and rotatably supports shafts of planet wheels 155. These shafts are also supported by a supporting ring 156A. The planet wheels 155 mesh with teeth on the outer periphery of the sleeve 149, which thus serves as a sun wheel. The planet wheels 155 also mesh with internal teeth at the outer periphery of an annulus 156, which is splined to the auxiliary shaft 147. The outboard end of the auxiliary shaft 147 is splined to a sun wheel 157 surrounding the shaft and meshing with planet wheels 158. The planet wheels 158 also mesh with internal teeth provided in an end portion of the housing 137. The planet wheels 158 are supported on shafts mounted in a planet carrier 159, which is splined to a wheel axle 160 which is coaxial with the shafts 142 and 147. The shaft 160 is provided with one of the wheels 5.

In operation, the tractor can be powered by both of the two engines 98 and 99, or by only one of them. There are advantages in providing a tractor with more than one engine of comparatively low power rather than with a single large engine. One is that, should one of the engines become defective, the tractor can continue to operate normally with the other engine, if the circumstances do not require high power, or the tractor can reach a repair shop under its own power. A further advantage is that certain jobs require the power of only one engine so that the tractor will operate more enconomically for these jobs. A third advantage is that it is generally cheaper to provide, for example, two engines of comparatively low power than one large engine having twice the power of one of the smaller engines, because smaller engines tend to be produced in larger quantities than large ones and are, therefore, appreciably cheaper. In this embodiment each of the engines 98 and 99 has a power of about seventy HP. Owing to the back-to-back disposition of the engines 98 and 99 a simple pinion coupling with the main shaft 105 is sufficient, in which each engine drives one of the pinions 100 and 101 respectively, which in turn, dependent upon the position of the coupling piece 104 connecting one or the other of the pinions 102 or 103 with the shaft 105, drives the shaft 105 through the pinion 102 or 103. By moving the coupling piece 104 along the shaft 105 the direction of travel of the tractor can be changed simply. On the sides of the engines 98 and 99 facing the shaft there are provided coupling members (not shown) for connecting or disconnecting the engines to or from the pinions 100 and 101 respectively. These coupling members as well as the coupling piece 104 can be operated from the driver's seat 13. If the direction of travel is changed by displacement of the coupling piece 104, the driver's seat 13 together with the steering wheel and other controls can be turned about the axis 15 so that the driver can face in the actual direction of travel.

The shaft 105 is connected by the gearbox 107 to drive the hydraulic pump 109 as well as the power take-off shaft 16 and hence, if the above-mentioned auxiliary shaft is provided, the two elements 92.

The hydraulic pump 109 pressurises fluid to drive the hydraulic motors 131 which drive the front wheels 4.

The front axle 6, with the front wheels 4 and the two elements 92, is freely pivotable about the shaft 16 with respect to the rest of the tractor so that the front wheels and the elements 92 can follow unevennesses of the ground independently of the ground conditions at the rear wheels 5. This precuation helps to keep the driven front wheels 4 and the elements 92 always on the ground so that, if wheel tracks have to be avoided, the elements 92 have a uniform low ground pressure, while the extensions 93 of the two elements 92 penetrate into the ground in an identical manner in order to ensure a good grip and a consequent high driving torque for the tractor. These advantages apply equally to an identical rotatable support which may be hitched to the rear lifting device 18.

The drive shaft 105 provides the input to the transmission 106, which comprises the variable pulley drives and the planetary change-speed arrangement shown in detail in FIG. 7. The shaft 105 directly drives the two front pulleys 114 and 115 through the bevel pinions 111 and 112. The rear pulleys 118 and 119 are driven by the belts 116 and 117. The transmission ratio between the front and the rear pulleys is determined by the positions of the belts with respect to the pulleys. This position is established by the hydraulic devices arranged in the housings 126 and 127 respectively, which can be supplied with pressurised fluid through the conduits 128 and 129 from the control valve 130. The springs 124 and 125 urge the inner flanges of the rear pulley towards the associated fixed flanges which are fastened to the shafts 120 and 121 respectively and so ensure that the belts 116 and 117 have the required tension for transmitting torque to the planetary gear arrangements 122 and 123 respectively.

The output shafts 120 and 121 of the rear pulleys constitute input shafts for the planetary gear arrangements (FIG. 7). The shaft 121 drives the shaft 142 and hence the annulus 143 through the pinions 140 and 141. When the ring 150 is held stationary with respect to the housing 137, in a manner to be described more fully later in this description, the sun wheel 148 and hence also the sleeve 149 are also held stationary with respect to the housing 137. The annulus 143 then drives the planet wheels 144 and consequently also the planet carrier 145 and the auxiliary shaft 147. Rotation of the shaft 147 is transmitted with a speed reduction by means of the sun wheel 157 and the planet wheels 158, which run around the teeth formed in the housing 137, the planet carrier 159 and hence to the wheel axle 160 and the wheel 5. In this condition the ring 152, the planet wheels 155 and the annulus 156 simultaneously rotate idly.

When the ring 150 is allowed to rotate and instead the planet carrier 152 is held stationary with respect to the housing 137, rotation of the shaft 142 is transferred in the following manner to the wheel axle 160. The driven annulus 143 causes the planet wheels 144, the planet carrier 145, the sun wheel 148 and the sleeve 149 to rotate. The sleeve 149 drives the satellite wheels 155 and hence the annulus 156, because the planet carrier 152, as stated above, is stationary. Relative coupling of these planetary systems is established, since the planet carrier 145 and the annulus 156 are both splined to the auxiliary shaft 147 and will, therefore, rotate with the same speed. By this conditions the speed of the auxiliary shaft 147 is fixed. Rotation of the auxiliary shaft 147 is again transferred as before by the pinions 157 and 158 and the satellite carrier 159 to the wheel axle 160 and hence to the wheel 5.

Figure 8:
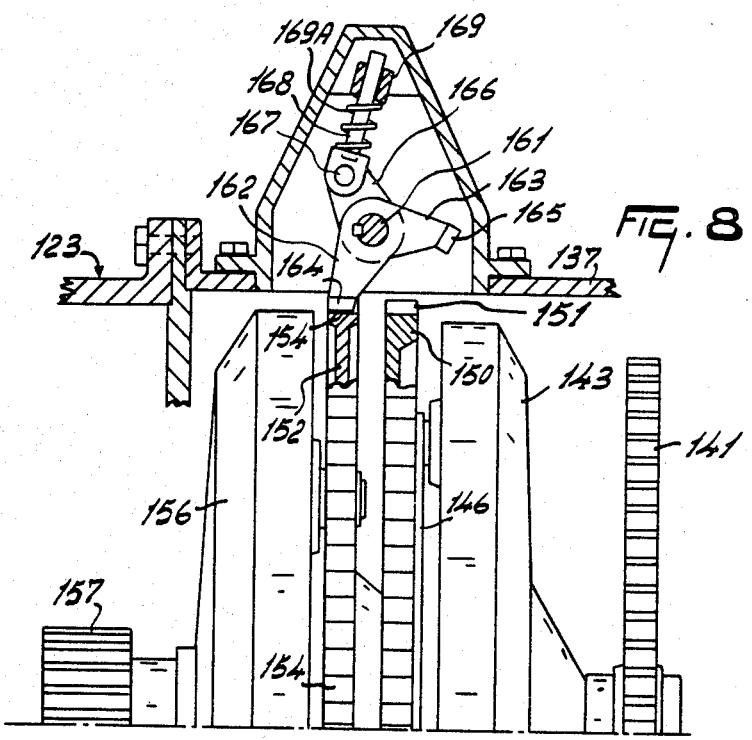
FIG. 8 is a sectional view taken on the lines VIII—VIII in FIG. 3.

Selective locking of the ring 150 or the planet carrier 152 is achieved by the arrangement shown in FIG. 8. Beyond the outer peripheries of the ring 150 and the planet carrier 152, a shaft 161 is journalled in the housing 137. The centerline of the shaft 161 lies in a plane which is perpendicular to the centreline of the auxiliary shaft 147 and is midway between the ring 150 and the planet carrier 152. Two arms 162 and 163 are keyed to the shaft 161 and constitute a pawl mechanism. Near their ends away from the shaft 161, the arms 162 and 163 are each provided with a tooth 164 and 165 respectively, which can engage the teeth 154 and 151 respectively. An arm 166 is rigidly secured to the arms 162 and 163. The arm 166 is disposed so that it is directed away from arms 162 and 163, its center line bisecting the angle between the two arms 162 and 163. The end of the arm 166 away from the shaft 161 is connected by a pivotal shaft 167 to one end of a rod 168 which, towards the other end, is slidable in a sleeve 169. This sleeve 169 is pivotable with respect to the housing 137 about a rocking shaft (not shown), which is parallel to the shafts 161 and 167. A compression spring 169A acts between the sleeve 169 and a shoulder on the rod 168 near the shaft 167 to bias the rod 168 out of the sleeve 169. The pivotal shaft 167 projects from the housing 137 and is displaceable from the driver's seat 13 in a direction substantially parallel to the auxiliary shaft 147.

The dimensions are such that in the position shown in FIG. 8, the tooth 164 engages the teeth 154, while when the arm 162 is turned away from the teeth 154, the arm 163 and its tooth 165 engages the teeth 151 of the ring 150. Each of these two positions is stable because, in either position, the pivotal shaft 167 is located outside a plane containing the centerline of the shaft 161, the shaft about which the sleeve 169 is pivotable, and hence in each of the two operative positions the pivotal shaft 167 is on one or the other side of the dead point in which the three axes are located in the same plane. The spring 169A thus provides and overcenter action and stable locking of the ring 150 or the planet carrier 152 is therefore achieved.

By thus locking the ring 150 of the planet carrier 152, either of two different transmission ratios can be set between each rear pulley 118 or 119 respectively and the associated wheel axle. Both transmission ratios allow the speed of the pulleys in each of these two positions to be comparatively high in order to avoid high belt tensions. By means of the two coupled planetary gear arrangements (FIG. 7) two ranges of speed of the tractor can be selected, one range covering about 2.5 to 10 kms/hour intended for operations requiring a high tractive force and a second range of speed covering about 7.5 to 30 kms/hour intended, for example, for hay making, fertilizer distribution and the like and for road transport.

Figure 6:
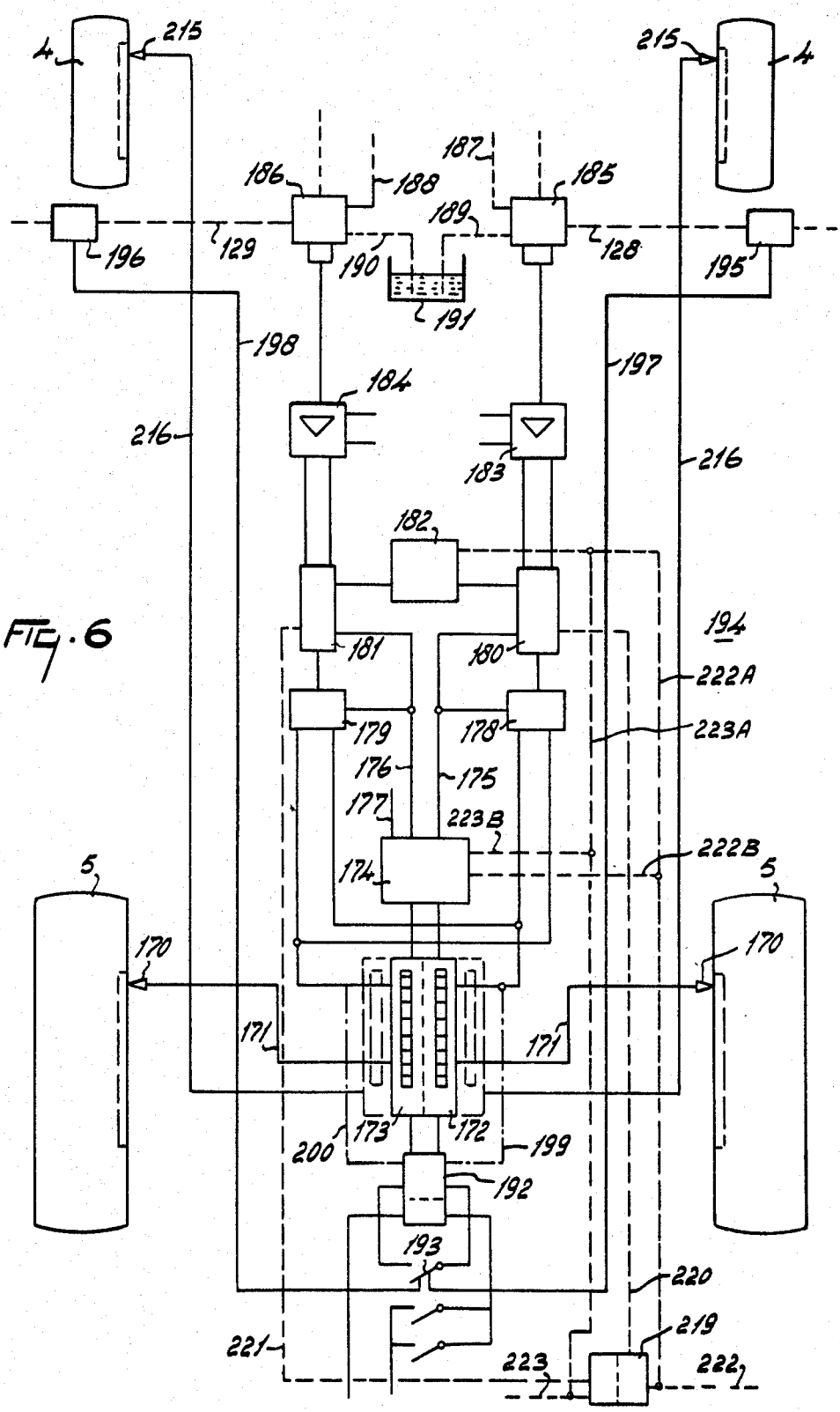
FIG. 6 shows schematically a control circuit of the tractor shown in FIGS. 3 to 5.

Each of the housings 137 (FIG. 7) is provided with an electric pick-up 170 (FIG. 6), in this case an inductive pick-up connected by leads 171 to a control circuit 194 (FIG. 5) which is shown schematically in FIG. 6. In order that the pick-up 170 operates as a counter, it is arranged in the direct proximity of the inner edge of the rim of the adjacent wheel 5 or of two wheels 4 and 5 succeeding one another in the direction of travel. In this embodiment the circumference of the inner edge of each wheel rim has one or more notches which move past the pick-up 170 when the tractor is moving. Each of the leads 171 is connected to a separate binary counter 172 and 173 respectively. In this embodiment each of the counters 172 and 173 respectively consists of, for example, three dividers-by-ten, each of which returns to the zero position at the tenth input pulse (emanating from the associated pick-up 170). The three coupled dividers indicate in known manner hundreds, tens and units and in this case counting can be continued up to one thousand, after which the counting process restarts. This sequence of dividers is provided with a reset device to that in any position the counters can be set to zero manually.

The outputs of the counters 172 and 173 of the control circuit 194 are connected with a comparator 174, which compares at any instant the values of the counters 172 and 173. The comparator 174 has three outputs 175, 176 and 177. The output 175 receives the logic "YES" signal, when the value of the counter 172 is higher than that of the counter 173, the output 176 received the "YES" signal when the value of the counter 173 is higher than that of the counter 172 and the output 177 receives the "YES" signal when the values of the counters 172 and 173 are equal. When one of the outputs 175, 176 or 177 has the "YES" signal, the two other outputs have a "NO" signal. The outputs 175 and 176 are connected to subtractors 178 and 179 respectively, comprising, for example, matching "full adders". The subtractors 178 and 179 are supplied with the binary data of the values of the counters 172 and 173 through leads 180 and 181. The outputs 175 and 176 of the comparator 174 are also connected to unequality comparators 180 and 181 respectively, each of which receives the binary data of the subtractors 178 and 179 respectively and a binary signal emanating from a setting unit 182. Each comparator 180 and 181 is coupled with an amplifier 183 and 184 respectively, each of which opens a hydraulic valve 185 and 186 respectively (these valves being coupled with the valve 130 of FIG. 5), when the associated comparator 180 and 181 respectively supplies a "YES" signal, so that pressurized hydraulic fluid in ducts 187 and 188 respectively is admitted to the conduit 128 and to the hydraulic device in the housing 126 or to a conduit 129 to the device in the housing 127 respectively (FIG. 5). The valves 185 and 186 are also provided with return conduits 189 and 190 respectively leading to a reservoir 191 for hydraulic fluid.

The counters 172 and 173 are coupled with a reset device 192. A signal from the reset device 192 is simultaneously applied to the two counters 172 and 173 and sets both counters to zero. The reset device 192 can be actuated by the driver by means of a switch 193.

When a notch in the wheel rims passes the adjacent pick-up 170, a pulse is applied to the counter 172 or 173 respectively. If the inner edge of the wheel rim has one notch, the counter will receive one pulse per revolution of the wheel. The pulses supplied to the counters 172 and 173 through the leads 171 are counted from a zero value established by the reset device 192. When the tractor moves straight ahead and if the two wheels 5 do not skid on the ground, the numbers of pulses counted by the counters 172 and 173 will be equal.

It should be noted that the reset device 192 is constructed so that closing of the switch 193 causes reset signal to be emitted only once and after re-opening and re-closing of the switch 193 it is again emitted only once, and so on.

If one of the wheels 5 skids, the number of revolutions counted by the counter 172 will differ from that counted by the counter 173. The comparator 174 assesses which of the counter 172 or 173 has the higher value and emits the appropriate signal to the output 175 or the output 176. If, for example, the number of revolutions counted by the counter 172 is higher than that of the counter 173, the output 175 receives a "YES" signal which is applied to the subtractor 178, which subtracts from that instant the binary values from the counted numbers of the two counters. The signal of the output 175 is also applied to the comparator 180, which constantly compares the binary difference applied by the subtractor 178 to the comparator 180 from the same instant with a predetermined binary number fixed in the setting unit 182. This number may be predetermined by the driver once for all and entered in the unit 182, but it may also be set by the driver at any instant during operation. The binary number fixed in the unit 182 is a limit value for the difference between the numbers of revolutions of the two wheels 5 and when this limit value is exceeded, means are automatically actuated for ensuring that the difference between the numbers of revolutions of the two wheels 5 will not increase or decrease. The binary number entered in the unit 182 may, for example, correspond to three wheel revolutions. As soon as the difference between the numbers of revolution of the two wheels 5 assessed in the subtractor 178 becomes equal to the binary number fixed in the unit 182 (for example the three revolutions), the comparator 180 applies a signal to the amplifier 183, which actuates the hydraulic valve 185 in a manner such that the hydraulic pressure in the conduit 187 connected with the hydraulic pump 109 is transferred to the fluid in the conduit 128 (FIG. 5). The pressure of the fluid in the conduit 128 increases the pressure by which the pulley flange located near the housing 26 is urged towards the other flange so that the belt 116 on the pulley 114 moves to a larger diameter position so that the transmission ratio to the corresponding wheel 5 is reduced and the wheel 5 will rotate more slowly, as a result of which skidding is eliminated. Each of the two conduits 128 and 129 includes a pressure switch 195 and 196 respectively, these switches being connected by leads 197 and 198 with the switch 193. As soon as the hydralic valve 185 raises the hydraulic pressure already prevailing in the conduit 128 as a result of skidding detected by the circuit arrangement 194, a signal is transmitted along the lead 197 after a time delay of, for example, 15 seconds, which signal causes the switch 193 to close so that the reset device 192 sets the two counters 172 and 173 to zero. Then the counters restart counting. If the counters 172 and 173 were not returned to zero after a pressure increase in the conduit 128, the circuit arrangement would continue to operate in response to the difference already recorded (the said three revolutions) so that the newly adjusted transmission ratio of the pulley 114 would be maintained, even though this may no longer be necessary. Since the counters 172 and 173 restart counting after a given lapse of time, and signals of the comparator 174 disappear and the subtractor 178 supplies the zero number. Therefore, the comparator 180 applies a "NO" signal to the amplifier 183 so that the valve 185 returns to its initial position (for example, by spring pressure) and the hydraulic conduit 128 is connected with the conduit 189, after which hydraulic fluid can flow back out of the hydraulic device in the housing 126 into the reservoir 191 so that the pulley 114 can return to its initial position.

The sequence of actions described above, it being assumed that one of the wheels 5 rotates with a higher speed than the other wheel 5 due to skidding, occurs in an analoguous manner when the latter wheel 5 performs more revolutions that the first-mentioned wheel due to skidding.

It is emphasized that this circuit arrangement is responsive to the number of revolutions of the driven wheels under consideration and hence with absolute, dimension-less quantities, as a result of which a high sensitivity of the control can be obtained. When the capacity of the counters 172 and 173 is full (for example, after one thousand revolutions), they automatically return to the zero position. When either one of the counters 172 or 173 is full, a feedback to the reset device 192 is preferred, through leads 199 and 200, so that both counters simultaneously restart counting at zero. It is thus ensured that accidental small differences are constantly corrected.

Figure 9:
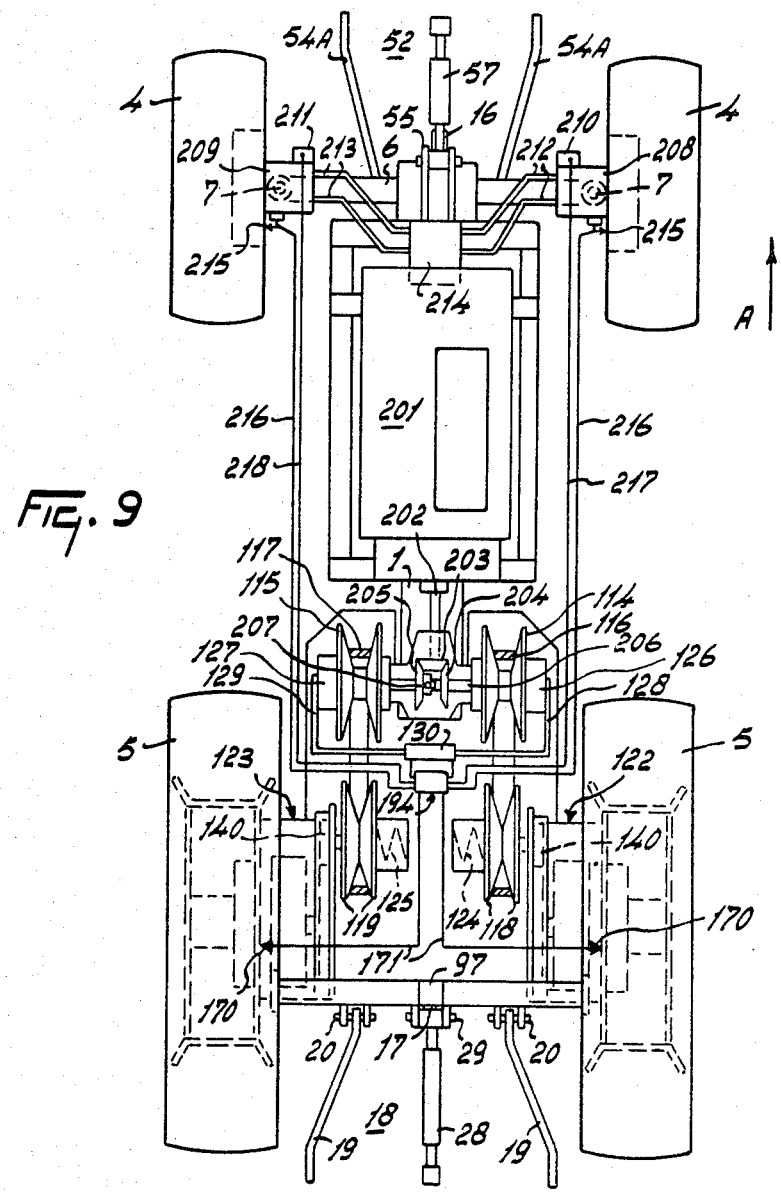
FIG. 9 is a schematic plan view of yet another embodiment of a tractor according to the invention, the superstructure of the tractor being omitted.

In the embodiments shown in FIG. 5, the front wheels 4 are driven by the hydraulic motors 131, which receive their hydraulic energy through pairs of hydraulic conduits 132 from the pump 109. The matching of the speed of the front wheels 4 obtained by the hydraulic drive with that of the rear wheels 5 is analogous with the coupling of the wheels 4 and 5 schematically illustrated in FIG. 9 and to be discussed with reference to FIG. 6. Parts shown in FIG. 9 and already described above are designated by the same reference numerals. The tractor shown in FIG. 9 is powered by a single engine 210, the output shaft of which is located in the central vertical plane of the tractor. As an alternative, the engine 201 may be replaced by two driving engines coupled together one behind the other and having their output shafts also located in the central vertical plane of the tractor. The output shaft of the rear engine or the output shaft 202 of the single engine 201 is provided with a bevel pinion 203, which meshes with bevel pinions 204 and 205 mounted rotatably on a horizontal shaft 206 extending transversely of the tractor. The portion of the shaft 206 located between the pinions 204 and 205 is surrounded by a coupling piece 207 which is rotationally secured to the shaft 206 but is axially displaceable along it. The driver can couple the coupling piece 207 by means of a claw joint with either one of the pinions 204 and 205, the tractor then moving forwards in one of said positions and backwards in the other position, as corresponds to the parts 100 to 105 described with reference to FIG. 5. The ends of the shaft 206 are again provided with pulleys 114 and 115, which are coupled by the belts 116 and 117 respectively to the pulleys 118 and 119 respectively, which are coupled by the planetary gear arrangements 122 and 123 with the rear wheels 5. The front wheels 4 are driven by hydraulic motors 208 and 209 respectively, each of which is provided with an adjusting device 210 and 211 respectively, by means of which, for example, swashplates associated with the motors 208 and 209 can be adjusted for regulating the output speed of the motors 208 and 209. These motors are supplied with fluid through hydraulic conduits 212 and 213 respectively from a hydraulic pump 214, which is driven by a drive shaft projecting from the front of the engine 201, which shaft furthermore rotates the front power take-off shaft 16 through a reduction gear.

The circuit arrangement 194 and the pick-ups 170 arranged near the wheels 5 operate to compare the number of revolutions of the wheels 5 and to exert control by means of the variable pulley transmissions as discussed above. Further pick-ups 215 (see FIG. 6) are disposed near the front wheels 4, and they are connected by conductors 216 to the circuit arrangement 194. Consequently, the number of wheels to be monitored and controlled is increased to four. The circuit arrangement 194 is extended by two further counters indicated in FIG. 6 by broken lines, these counters being additional to the counters 172 and 173. Corresponding additions are made to the rest of the circuit arrangement 194, but for the sake of clarity this is not shown in FIG. 6. In this case four hydraulic valves (similar to valves 185 and 186 in FIG. 6) are provided, each of which is connected in an analogous manner with the speed control of a wheel. Hydraulic connections 217 and 218 (FIG. 9) similar to the hydraulic connections 128 and 129 couple corresponding control valves with the adjusting devices 210 and 211 so that when the circuit arrangement 194 detects the limit value of a difference between the numbers of revolutions of one of the four wheels and of the further three wheels, the drive train for the wheel concerned (the pulleys 114, 115 or the hydraulic motors 208, 209) is corrected so that the number of revolutions is matched to the other three wheels. The hydraulic valve similar to each of the valves 185 or 186 coupled with one of the front wheels communicates therewith by means of hydraulic conduits 217 and 218 respectively, by means of which the swashplate concerned can be displaced in known hydraulic manner.

This arrangement ensures that, when travelling straight ahead, the peripheral speed of the four wheels is always the same. It should be noted that the pick-up arrangement has to be adapted to take account of the wheels 4 and 5 having different diameters. As stated above, each wheel rim has one or more notches which move past the pick-up 170 or 215 respectively during travel. In order to ensure a measurement of the real path covered by the periphery of the wheel concerned, the number of notches in the rim of the wheel of smaller diameter is proportionally smaller than the number of notches in the rim of the wheel of larger diameter so that the same number of pulses from each of the wheels represents the same distance covered. The circuit arrangement 194 of FIG. 6 can be readily adapted to operate when the tractor is negotiating bends. In a bend, the wheels on one side of the tractor rotate more rapidly than the wheels on the other side so that the difference between the numbers of revolution of the wheels on the two sides of the tractor constantly increases.

The circuit arrangement 194 automatically provides for straight-line travel of the tractor, and skidding of the wheels on either side of the tractor is then invariably eliminated. During straight-ahead travel, the steering wheel 14 is in a central position inclusive of a small region of tolerance on either side of that position. As soon as the steering wheel leaves this region of tolerance it depresses a switch in each direction of deflection, this switch being connected by leads 222 and 223 respectively (FIG. 6) to a pulse generator 219 which in turn is connected by leads 220 and 221 respectively to the unequality comparators 180 and 181 respectively, while at the same time the setting unit 182 is taken out of the circuit (broken lines 222A and 223A in FIG. 6). The pulse generator 219 comprises two parts, each supplying as a function of time a number of pulses depending on the degree of steering wheel deflection and the time for which this deflection is maintained. Each part of the pulse generator 219 has a time base, the frequency of which is fixed inter alia by a potentiometer which is adjusted by the deflecting steering wheel. The number of pulses rate from each part of the pulse generator 219 is also proportional to the travelling speed. If, for example, a bend has to be covered in which the wheels located on the side of the comparator 180 rotate with a lower speed than those on the other side of the tractor, the time bases of the parts of the pulse generator 219 are adjusted by the potentiometer so that the number of pulses per unit time applied through the line 220 to the comparator 180 is smaller than the number of pulses per unit time applied through the line 221 to the comparator 181. These applied pulse sequences are again limit values representative of the desired maximum difference between the numbers of revolutions of the wheels on both sides of the tractor.

When the pulse generator 219 is switched on by deflection of the steering wheel, a "YES" signal is automatically applied to the two outputs 175 and 176 of the comparator 174 (broken lines 222B and 223B in FIG. 6) so that the two subtractors 178 and 179 become operative. The measured difference applied to the comparators 180 and 181 respectively and to the added comparator (the signal emanating from the pick-ups 170 and 215 constantly increases as a function of time) is compared with the relatively different pulse sequences applied through the lines 220 and 221 respectively to said comparators. If skidding occurs on one side of the tractor, the number of revolutions in a bend assessed by one of the pick-ups 170 will abruptly increase and exceed the limit value fixed by the part concerned of the pulse generator 219 so that the amplifier 183 causes the valve 185 to become operative as a result of which the variable pulley transmission for the rear wheel 5 or the hydraulic motor for the front wheel 4 reduces the speed of the skidding wheel. It should be noted that the connection between the steering wheel and the steerable wheels 4 may be established by known mechanical or hydraulic agency.

FIG. 10 shows an alternative embodiment in which parts corresponding with those of the preceding embodiments are designated by the same reference numerals. The tractor shown in FIG. 10 is powered by two aligned engines 98 and 99 which are at right angles to the central vertical plane of the tractor. They can be coupled to the drive shaft 105 to rotate it in either direction by means of the gear wheel system 100 to 103 and the coupling piece 104 described above. The shaft 105 drives the pulleys 114 and 115, and 119 respectively, which are connected by hydraulic conduits 229 and 230 to the control valve 231 controlled by the circuit arrangement 194 of FIG. 6.

In FIG. 10, the shaft provided with the rear pulleys 118 and 119 is provided with a bevel pinion 224 which meshes with a bevel pinion 225 on a drive shaft 226 constituting the input shaft of a planetary gear arrangement 227 which is identical to one of the planetary gear arrangements shown in FIG. 5 for the construction illustrated in FIGS. 7 and 8. The output shaft 160 (FIG. 7) constitutes in this case the input shaft of a differential 228 for balancing the torque applied to the wheels 5. Since the gear arrangement 227 provides two overlapping ranges of speed, as described above, and the variable pulley transmission operates at a high enough speed to transfer the driving torque effectively, an embodiment of the tractor as shown in FIG. 10 can be obtained with a reliable, steplessly variable transmission, the disadvantages of the brake belts of the conventional automatic transmissions are avoided. The construction of FIG. 10 can be produced at low cost. The front pulleys 114 and 115 are controlled by the above-mentioned hydraulic devices in the housings 126 and 127, which communicate through hydraulic conduits 229 and 230 respectively with the control valve 231, which can be adjusted from the driver's seat. By adjusting the control valve 231, the distance between the flanges of the pulleys 114 and 115 and hence the transmission ratio of the variable pulley transmission can be steplessly varied.

With regard to the embodiments described above it should be noted that those features such as control devices which are described in connection with one of the embodiments and are suitable for use in one or more others of the described embodiments should be considered to form also part of such embodiments.

Although various features of the tractors, described and illustrated in the drawings, will be set forth in the following claims as inventive features, the invention is not necessarily limited to these features and encompasses all of the features described both individually and in various combinations.

I claim:

1. An agricultural tractor comprising an engine, wheels driven by said engine and a power take-off shaft driven by said engine with a rotational speed proportional to the rotational speed of said wheels, in combination with an agricultural implement which includes at least one rotational soil contacting member and coupling means which connects said soil contacting member with said power take-off shaft so that the rotational speed of said member is proportional to the rotational speed of said wheels and its operational peripheral speed is the same as the tractor's travelling speed, said member being constructed and arranged to avoid compaction of the soil which is adverse to plant growth and to improve traction of the combined tractor and said member.

2. A combination as claims in claim 1, wherein said member compries rotary support means, the peripheral speed of said rotary support means provided by said engine via said coupling means and soil power take-off shaft being essentially the same as the peripheral speed of said wheels provided by said engine.

3. A combination as claimed in claim 2, wherein said power take-off shaft is coupled to the torque converter of said shaft.

4. A roller for use in soil cultivation which is adapted for connection to a tractor so that the roller's axis of rotation is transverse to the tractor's direction of travel, the roller comprising connective means for connection to said tractor and coupling means for interconnection to the tractor's engine so that the operational peripheral speed of said roller is essentially the same as the travelling speed of the tractor and said roller exerts a tractive force on the tractor, said roller being so constructed and arranged to support at least in part the tractor's weight and to avoid adverse compaction of the soil while exerting said tractive force.

5. A roller as claimed in claim 4, wherein said coupling means is adapted to be connected directly to a driven wheel of the tractor.

6. A roller as claimed in claim 5, wherein said coupling means comprises chain means and two sprockets, one said sprocket connectible to said driven wheel, the other said sprocket connected to rotate the roller, and said chain means driven by engaging said sprockets.

7. A roller as claimed in claim 4 which comprises a plurality of spaced apart elongate means disposed around and comprising at least substantially its periphery.

8. The combination of a roller and a soil cultivating machine supported by the roller, the roller being adapted for connection to a tractor and comprising coupling means for a driving interconnection to the tractor's engine so that the roller's operational peripheral speed is essentially equal to the cultivating machine's travelling speed and said roller exerts a tractive force on the tractor, said roller being arranged and constructed to bear at least part of the tractor's weight and to avoid slippage and deterioration of the soil structure by compaction.

9. A combination as claimed in claim 8 comprising a frame which includes means for connecting the roller to the soil cultivating machine and means for connection to a three-point lifting device provided on the tractor.

10. A combination as claimed in claim 9 wherein said soil cultivating machine includes a plurality of ground working elements which are rotatable about upwardly directed axes.

11. A combination as claimed in claim 10 wherein further coupling means connected to said first mentioned coupling means is arranged to rotate said ground working elements.

12. A vehicle for agricultural operations which comprises: an agricultural tractor including a frame, a power source, a power take-off from said power source, ground wheels and coupling means comprising linkages at its forward and rear aspects; rotary support means and agricultural implements connected to each of said coupling means whereby there is a rotary support means and an agricultural implement interconnected to each end of said frame by said coupling means, said rotary support means adapted to support at least in substantial part said tractor to reduce pressure of the tractor on the underlying soil and avoid deterioration of the soil structure by compaction; driving means operatively connected to said power source for supplying energy to operate at least one of said implements; a detachable shaft interconnecting said power take-off shaft and one of said rotary support means to drive the latter at a speed proportional to the speed of said ground wheels so that the tractive forces of said rotary support means are combined with the tractive forces of said tractor for propelling the vehicle; and power means operatively connected between and directly to one said coupling means and the associated said rotary support means for moving the associated said rotary support means and the associated said implement substantially vertically together relative to said tractor, the associated said linkage adapted to maintain the angular disposition of the associated said implement relative to the ground substantially unchanged when it is moved by said power means.

13. The combination of claim 1 wherein said tractor includes and is supported by a set of forward ground engaging wheels and a set of rear ground engaging wheels, said soil contacting member being adjacent one of said sets of wheels and having a width substantially greater than the overall width of said adjacent set of ground supporting wheels.

14. A combination as claimed in claim 13 wherein the outer surface of said soil contacting member lies substantially within a cylinder and comprises a plurality of spaced apart rods, tubes or strips.

15. A roller as claimed in claim 4 which has an overall width substantially greater than said tractor's width.

16. A combination as claimed in claim 8 wherein the roller has a width substantially greater than the width of the tractor to which it is adapted to be connected.

17. A roller as claim in claim 16 which has an outer surface conforming substantially to a cylinder and which comprises a plurality of spaced apart rods, tubes or strips.

18. A vehicle as claimed in claim 12 wherein each said rotary support means and each said implement cover an overall width greater than the width of said tractor.

19. A vehicle as claimed in claim 18 wherein each said rotary support means has an outer surface which conforms substantially to a cylinder and comprises a plurality of spaced apart rods, tubes or strips.

* * * * *